United States Patent
Giziewicz et al.

(10) Patent No.: US 10,873,402 B2
(45) Date of Patent: Dec. 22, 2020

(54) METHODS AND ACTIVE OPTICAL CABLE ASSEMBLIES FOR PROVIDING A RESET SIGNAL AT A PERIPHERAL END

(71) Applicant: Corning Research & Development Corporation, Corning, NY (US)

(72) Inventors: Wojciech Piotr Giziewicz, Berlin (DE); Tiernan Sean McCann, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/398,635

(22) Filed: Apr. 30, 2019

(65) Prior Publication Data
US 2020/0350997 A1    Nov. 5, 2020

(51) Int. Cl.
| H04B 10/80 | (2013.01) |
| G02B 6/44  | (2006.01) |
| H01B 11/22 | (2006.01) |
| G06F 13/38 | (2006.01) |
| H04B 10/40 | (2013.01) |

(52) U.S. Cl.
CPC ......... *H04B 10/808* (2013.01); *G02B 6/4416* (2013.01); *G06F 13/382* (2013.01); *H01B 11/22* (2013.01); *H04B 10/40* (2013.01)

(58) Field of Classification Search
CPC .... H04B 10/808; H04B 10/40; G02B 6/4416; G06F 13/382; H01B 11/22

USPC .......................................................... 385/101
See application file for complete search history.

(56) References Cited

U.S. PATENT DOCUMENTS

| 7,587,536 | B2 | 9/2009 | McLeod |
| 8,984,321 | B2 | 3/2015 | Foster et al. |
| 9,112,601 | B2 | 8/2015 | Gao et al. |
| 9,398,329 | B2 | 7/2016 | Lee et al. |
| 2002/0044746 | A1* | 4/2002 | Kronlund ......... H04B 10/25891 385/53 |
| 2014/0023312 | A1* | 1/2014 | Shang ................ H04B 10/40 385/12 |

* cited by examiner

*Primary Examiner* — Jerry M Blevins
(74) *Attorney, Agent, or Firm* — Michael E. Carroll, Jr.

(57) ABSTRACT

Methods and active optical cable assemblies for sending a reset signal from a host end of an active optical cable assembly to a peripheral end are disclosed. In one embodiment, a method of resetting a peripheral end of an active optical cable assembly wherein data contacts of a host end of the active optical cable assembly are not coupled to data contacts of the peripheral end of the active optical cable assembly includes detecting a reset signal on one or more data contacts of the host end of the active optical cable assembly. The method further includes, in response to detection of the reset signal, generating a peripheral reset signal at the peripheral end of the active optical cable assembly.

13 Claims, 4 Drawing Sheets

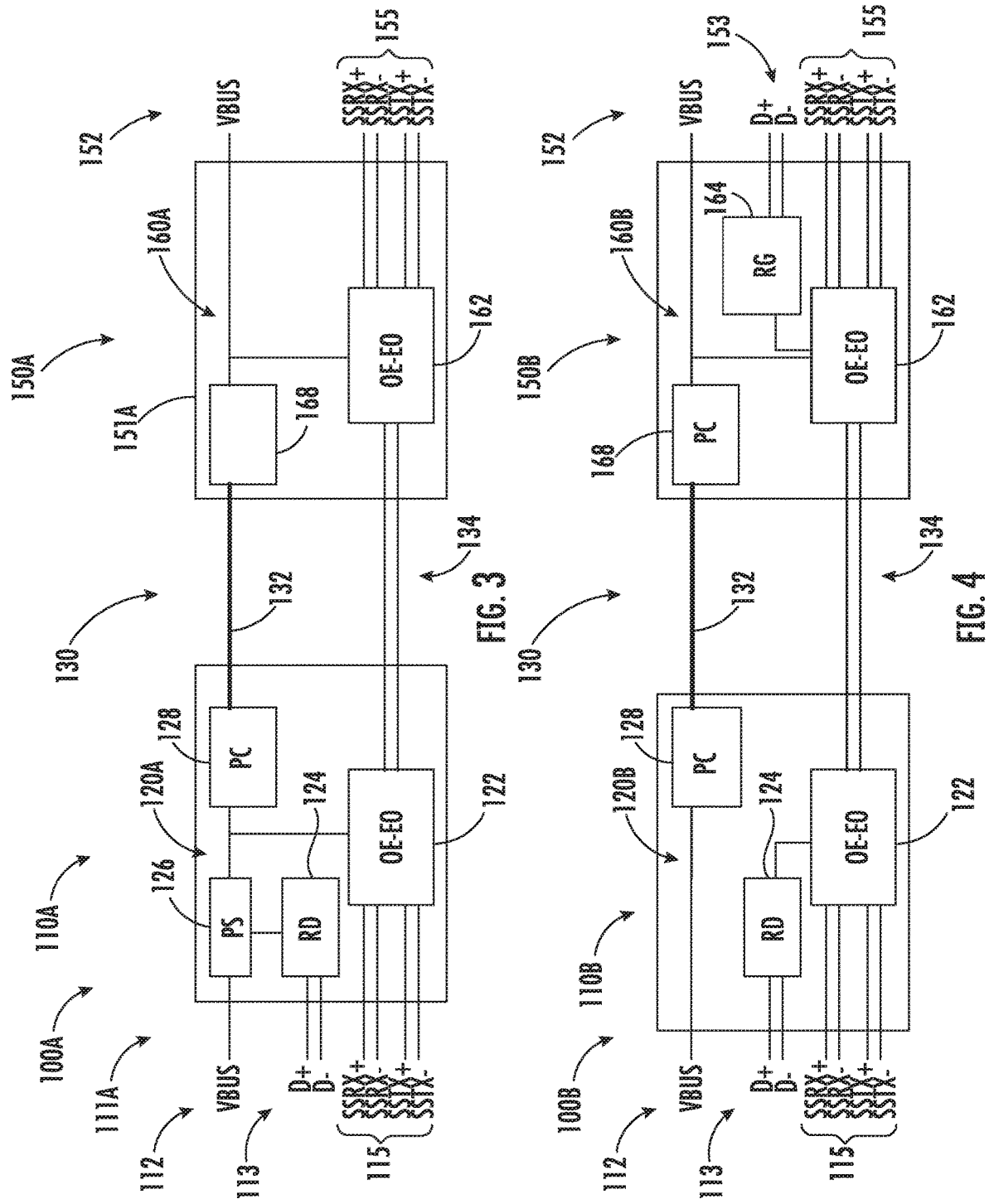

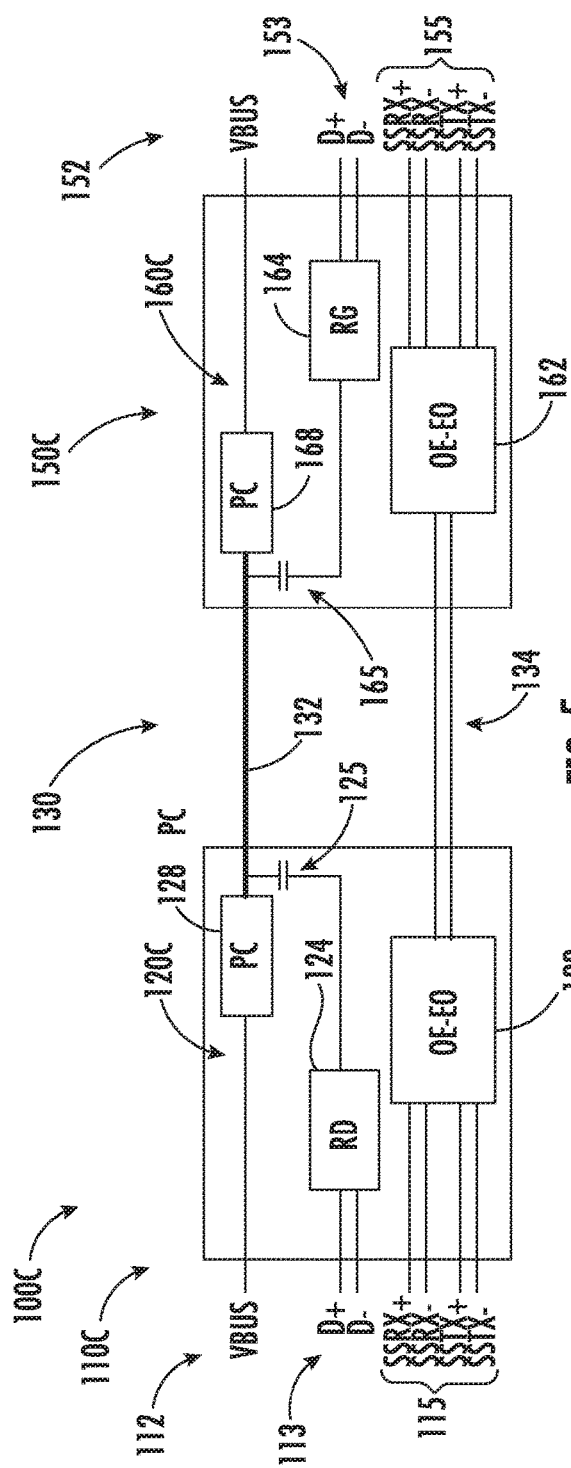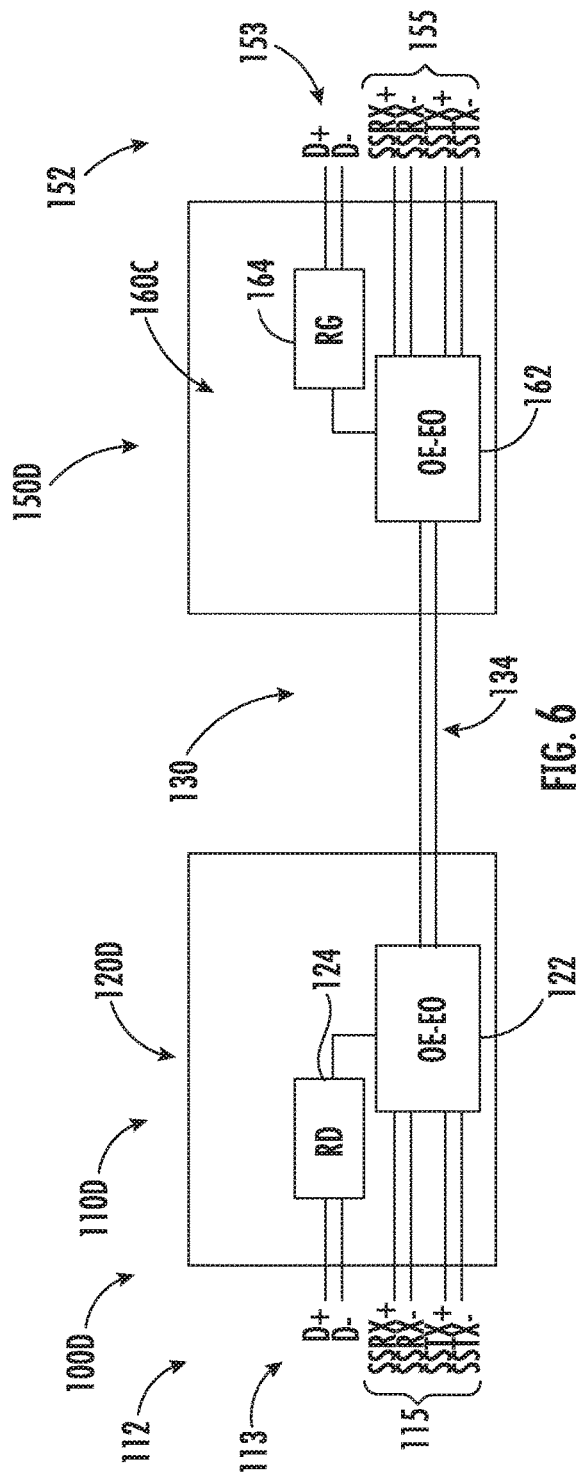

METHODS AND ACTIVE OPTICAL CABLE ASSEMBLIES FOR PROVIDING A RESET SIGNAL AT A PERIPHERAL END

BACKGROUND

Field

The present disclosure generally relates to active optical cable assemblies and, more particularly, to methods and active optical cable assemblies for sending a reset signal from a host end of an active optical cable assembly to a peripheral end to reset a peripheral electronic device that is connected to the peripheral end.

Technical Background

As the data rate of communication protocols increases, it becomes difficult to transmit signals using purely electrical cables. Optics has provided a solution to the distance versus data rate problem for the telecommunication and data center markets. Benefits of optical fiber include longer reach, extremely wide bandwidth and low noise operation. Because of these advantages, optical fiber is increasingly being used for a variety of applications, including, but not limited to, broadband voice, video, and data transmission. Optical fiber is emerging as the lowest cost and most compact interconnect technology in an increasing number of consumer electronics applications, especially at lengths greater than a few meters.

Some active optical cable assemblies may not include electrical conductors to provide electrical power to a peripheral electronic device. Additionally, some active optical cable assemblies may not provide a communication medium (e.g., electrical conductors or optical fibers) between data contacts used to confirm whether or not a peripheral electronic device is connected to the peripheral end of the active optical cable. In some cases, when the host electronic device cannot detect whether or not a peripheral electronic device is connected and cannot send a reset signal to the peripheral electronic device, the peripheral electronic device may be placed into an unresponsive state, thereby rendering the peripheral electronic device inoperable.

SUMMARY

Embodiments of the present disclosure are directed to active optical cable assemblies capable of resetting a peripheral electronic device despite the active optical cable not having one or more power electrical conductors for providing electrical power and/or not having a communication medium (optical or electrical) between contacts for communicating connection of a peripheral electronic device (e.g., low-speed data contacts of a USB connector).

In one embodiment, a method of resetting a peripheral end of an active optical cable assembly wherein data contacts of a host end of the active optical cable assembly are not coupled to data contacts of the peripheral end of the active optical cable assembly includes detecting a reset signal on one or more data contacts of the host end of the active optical cable assembly. The method further includes, in response to detection of the reset signal, generating a peripheral reset signal at the peripheral end of the active optical cable assembly.

In another embodiment, an active optical cable assembly includes an active optical cable having a host end, a peripheral end, and one or more optical fibers between the host end and the peripheral end. The active optical cable assembly further includes a host connector disposed at the host end of the active optical cable and a peripheral connector disposed at the peripheral end of the active optical cable. Each of the host connector and the peripheral connector includes one or more low-speed data electrical contacts, one or more high-speed data electrical contacts, and an optical transceiver module. The one or optical fibers are optically coupled to the optical transceiver module of the host connector and the optical transceiver module of the peripheral connector. The optical transceiver module of each of the host connector and the peripheral connector is configured to convert electrical signals received on the respective one or more high-speed data contacts into optical signals for transmission on the one or more optical fibers, and to convert optical signals received on the one or more optical fibers into electrical signals for transmission on the respective one or more high-speed data contacts. The one or more low-speed data contacts of the host connector are not electrically coupled to the one or more low-speed data contacts of the peripheral connector. The host connector further includes a reset detect circuit that is electrically coupled to the one or more low-speed data contacts and is configured to detect a reset signal on the one or more low-speed data contacts of the host connector. Detection of the reset signal on the one or more low-speed data contacts by the reset detect circuit causes a peripheral reset signal on the one or more low-speed data contacts of the peripheral connector.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3 schematically depicts internal components of an example active optical cable assembly having one or more electrical conductors according to one or more embodiments shown and described herein;

FIG. 4 schematically depicts internal components of another example active optical cable assembly having one or more electrical conductors according to one or more embodiments shown and described herein;

FIG. 5 schematically depicts internal components of another example active optical cable assembly having one or more electrical conductors according to one or more embodiments shown and described herein;

FIG. 6 schematically depicts internal components of another example active optical cable assembly having one or more electrical conductors according to one or more embodiments shown and described herein.

DETAILED DESCRIPTION

Figure 1:
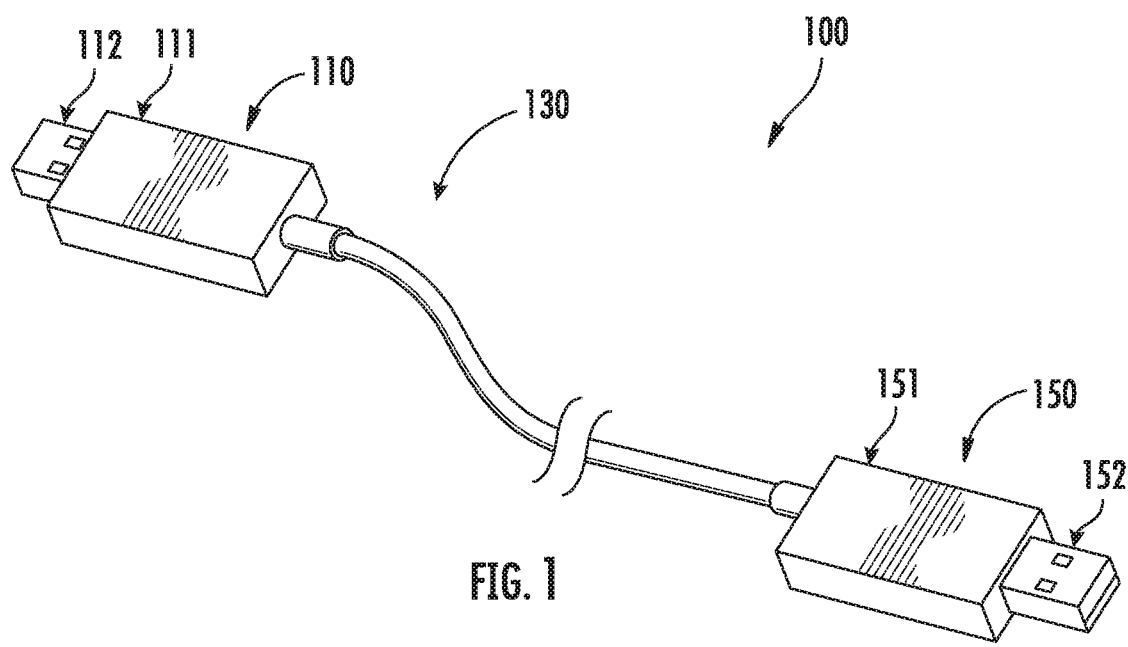
FIG. 1 schematically depicts an example active optical cable assembly according to one or more embodiments shown and described herein.

Embodiments of the present disclosure are directed to active optical cable assemblies capable of resetting a peripheral electronic device despite the active optical cable not having one or more power electrical conductors for providing electrical power to a connected peripheral electronic device and/or not having a communication medium (optical or electrical) between contacts for communicating the connection of a peripheral electronic device (e.g., low-speed data contacts of a Universal Serial Bus (USB) connector).

Communication cables are devices that enable communication and, in some cases electrical power, between a host electronic device and a peripheral electronic device. These communication cables typically include a host connector at a host end of the cable that plugs into a receptacle of the host electronic device (e.g., a desktop computer, a laptop computer, and the like), and a peripheral connector at a peripheral end of the cable that plugs into a receptacle of the peripheral electronic device (e.g., an external hard drive, a camera, a smartphone, and the like). Communication protocols enable data in the form of electrical signals to be passed to and from the host electronic device and the peripheral electronic device over electrical conductors in the cable. Additionally, electrical conductors may be included in the cable to provide electrical power from the host electronic device to the peripheral electronic device coupled to the peripheral connector of the cable.

There are currently several communication standards that are used to enable communication and power to be provided over such communication cables. Example standards include, but are not limited to, Universal Serial Bus (e.g., USB 1.X, 2.0, 3.X, and the like) and Thunderbolt™. Each standard has requirements regarding how electronic devices are coupled and decoupled, and how communication is provided between coupled electronic devices.

One aspect of communication between coupled electronic devices is the detection of a peripheral electronic device at a peripheral end of the cable. In the USB specification, the VBUS line is for detection of a host electronic device. It is noted that although embodiments are described in the context of the USB standard, embodiments are not limited thereto. Aspects of the embodiments described herein may be used in any communication standard.

As shown by the USB Superspeed state machine illustrated in FIGS. 10-26 of the USB specification (Universal Serial Bus 3.2 Specification, Revision 1.0), an aspect of moving from a disconnected link to a connected link is the presence of a 5V signal on the VBUS line. Even in the case of self-powered (rather than bus-powered) peripheral electronic devices such as hard drives, the VBUS line is effectively used as a hot plug detect signal, i.e. to indicate to the peripheral device that it has been connected to a hub or host device and can start to move through the link state machine. If a peripheral electronic device powers up (i.e. provides its own VBUS to the USB device controller by its own power source) and attempts to find a link partner, it will stay for a limited time in the RX.Detect state and then move to the USDPort.Disabled state. The only way to exit from the USDPort.Disabled state is a power reset (i.e. turn power supply off and on) or receiving a USB2 Reset signal from the host electronic device on the device USB2 data lines. If neither of these events occurs, the peripheral electronic device will remain in this state and appear unresponsive and non-functional.

The USB2 connection and power-up cycle is illustrated by FIGS. 7-29 of the USB2 Specification (Universal Serial Bus Specification, Revision 2.0). The reset event is also used to transition between USB2 device states aside from during start-up as described in section 9.1 of Universal Serial Bus Specification, Revision 2.0. The USB2 Reset signal is shown in FIGS. 7-29 where the USB2 pins (i.e., D+ and D−) are pulled low for a period of time (about 10 ms) by the host electronic device and received by the corresponding USB2 pins at the peripheral electronic device.

This by design fault condition creates a problem for active optical cable assemblies. An active optical cable is a cable configured to communicate by optical signals rather than electrical signals according to an industry standard. Thus, each connector at each end of the active optical cable includes a transceiver circuit that converts an electrical signal received from a host or peripheral electronic device into an optical signal for transmission over one or more optical fibers of the cable, and that converts an optical signal received from the one or more optical fibers into electrical signals to be passed on to the host or peripheral electronic device. To the host and peripheral electronic devices, it appears that communication is occurring over traditional electrical conductors within the cable.

However, active optical cable assemblies having one or both of the following attributes may cause the peripheral device to be unresponsive because it cannot receive the USB2 Reset signal on the USB2 data lines: 1) No galvanic connection between the host connector and the peripheral connector on power (e.g., VBUS) and ground (GND) pins, and 2) No galvanic or optical connection between data pins communicating and receiving a reset signal (e.g., USB2 signal pair) between the host connector and the peripheral connector.

In the first such configuration of an active optical cable assembly, the peripheral electronic device must be powered separately from the host electronic device. Depending on when and how the peripheral electronic device is powered on (relative to when the peripheral electronic device is connected via the active optical cable to the host electronic device), it is possible for the peripheral electronic device to not function at all due to the peripheral device connection state machine as defined by the USB standard. If a peripheral electronic device receives power for a certain time (less than 1 s) before being connected to a host electronic device, it will enter a state from which it can only exit by power cycling. A user may mistakenly believe that the active optical cable is malfunctioning.

Embodiments of the present disclosure include active optical cable assemblies including a circuit that monitors the low-speed data contact for a reset signal. The circuit then acts as a result of this detection to send a peripheral reset signal to the peripheral connector at the peripheral end of the active optical cable to force the connected device out of its disabled port state. Methods of performing the functionalities of the active optical cable assemblies are also disclosed.

As described in more detail below, the circuit may be embedded in an optoelectronic transceiver, may be based on an external microprocessor, or based on purely passive external components. In embodiments, the cable itself does not have a link (electrical, optical, or any other medium) between low-speed data pins that communicate a reset signal on either end of the active optical cable. The active optical cable may or may not have electrical conductors to transmit VBUS power from one end of the cable to the other.

In embodiments described herein, active optical cable assemblies are operated according to a standard capable of communicating data at two data rates. As used herein, "low-speed data" means data that is transmitted at a data rate that is slower than "high-speed data." In the USB 3.X context, the low-speed data contacts are the D+ and D− USB2 pins, and the high-speed data contacts are the SSRX+, SSRX− and SSTX+, SSTX− USB3.X Superspeed pins. As stated above, in the active optical cable assemblies described herein, there are no electrical conductors or optical fibers coupling the low-speed data contacts at each end of the cable assembly.

Various methods and active optical cable assemblies capable of resetting the peripheral electronic device in response to instruction from a host electronic device despite having: 1) No galvanic connection between the host connector and the peripheral connector on power and ground pins, and/or 2) no galvanic or optical connection between data pins communicating and receiving a reset signal between the host connector and the peripheral connector.

Referring now to FIG. 1, an example active optical cable assembly 100 is schematically illustrated. It should be understood that the example active optical cable assembly 100 of FIG. 1 is provided for illustrative purposes only, and that other configurations and connector types are possible. In the illustrated embodiment, the example active optical cable assembly 100 comprises a first connector 110 (i.e., a host connector) at a first end (i.e., a host end) of a cable 130 and a second connector 150 (i.e., a peripheral connector) at a second end (i.e., a peripheral end) of the cable 130. The first connector 110 and the second connector 150 are illustrated as USB plugs; however embodiments are not limited thereto. It should be understood that the optical cable assemblies described herein may have any connector type.

The cable 130 comprises one or more optical fibers 134 and may comprise one or more electrical conductors 132 (i.e., wires) within a jacket. The one or more optical fibers 134 and the one or more electrical conductors 132 are not shown in FIG. 1 (see FIG. 3 as an example). The first connector 110 comprises a housing 111 and a first electrical connector 112 (i.e., a host electrical connector) at a face of the housing 111. The first electrical connector 112 comprises electrical contacts for communicating electrical data signals as well as for receiving electrical power from a host. Similarly, the second connector 150 comprises a second housing 151 and a second electrical connector 152 (i.e., a peripheral electrical connector) at a face of the second housing 151. The second electrical connector 152 also comprises electrical contacts for communicating electrical data signals and, in some embodiments, for providing electrical power to a peripheral device (connected to the first connector 110 by way of the one or more electrical conductors within the cable 130). The length of the cable 130 is not limited by this disclosure. As a non-limiting example, the cable 130 may be greater than 40 m.

Figure 2:
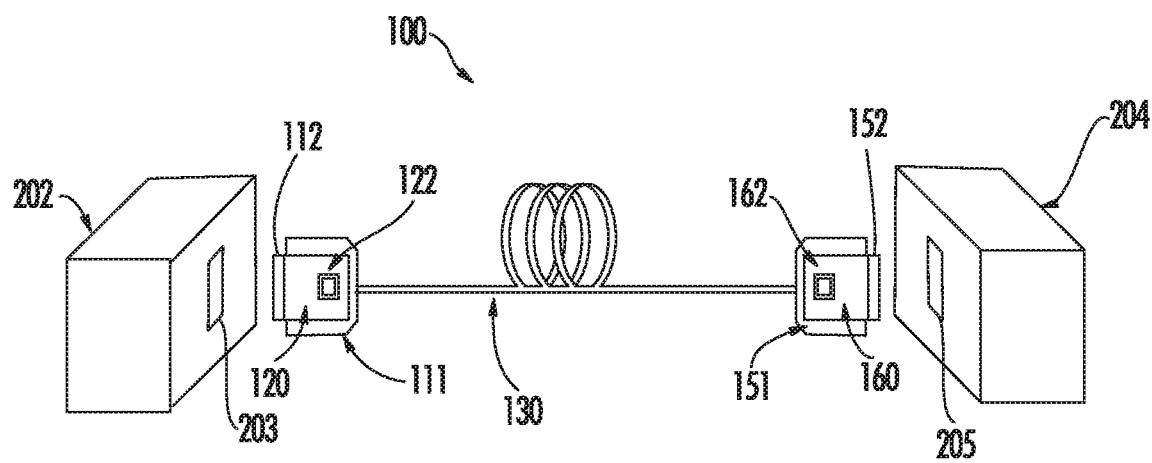
FIG. 2 schematically depicts an example active optical cable assembly, an example host electronic device and an example peripheral electronic device according to one or more embodiments shown and described herein.

FIG. 2 illustrates the example active optical cable assembly 100 being mated to a host electronic device 202 and a peripheral electronic device 204. The host electrical connector 112 is a plug that is received by a host receptacle 203. Similarly, the peripheral electrical connector 152 is a plug that is received by a peripheral receptacle 205. In other embodiments, the host and peripheral electrical connectors 112, 152 are each configured as a receptacle for mating with a plug of a respective electronic device. The host and peripheral electronic devices 202, 204 may be any electronic device including, but not limited to, a server device, a personal computer, an external storage device, a photographic device, a display device, a cellular phone, and a media player.

An optical engine 120, 160 resides in host and peripheral connectors 110, 150 of the optical cable assembly 100 that is responsible for realizing the electrical-to-optical conversion and optical-to-electrical conversion. The optical engines 120, 160 may comprise a printed circuit board assembly that maintains an optical transceiver module 122, 162 and other electronic components for electro-optical and opto-electrical conversion.

The optical cable assemblies described herein are active optical cable assemblies in the sense that they actively convert optical and electrical signals within the cable. The optical engines 120, 160 convert high-speed electrical signals (i.e., payload data) into high-speed optical signals inside the host and peripheral connectors 110, 150, which are transmitted over optical fibers and converted back to the electrical domain inside the electrical connector at the opposite end of the active optical cable assembly 100. Active optical cable assemblies may be attractive for many consumer applications because they provide familiar tested electrical interfaces while providing the optical transport advantages of optical fiber communication.

Referring now to FIG. 3, an example active optical cable assembly 100A according to one embodiment is schematically illustrated. The host electrical connector 112 comprises electrical contacts including a power contact (i.e., VBUS) low-speed data contacts 113 (in the USB context, D+ and D−contacts), and high-speed data contacts 115 (in the USB context, SSRX+, SSRX−, SSTX+, SSTX− contacts). The peripheral electrical connector 152 comprises electrical contacts including a power contact (i.e., VBUS) and high-speed data contacts 155 (in the USB context, SSRX+, SSRX−, SSTX+, SSTX− contacts). The active optical cable assembly 100A may also include low-speed data contacts; however, they are not utilized in this embodiment.

The host optical engine 120A is disposed within the housing 111A of the host connector 110A. The host optical engine 120A of the example embodiment comprises a host optical transceiver module 122, a reset detect circuit 124, a power switch circuit 126, and optionally a power condition circuit 128. The power switch circuit 126 is electrically coupled to the VBUS contact and the power condition circuit 128. Alternatively, there is no power condition circuit 128 and the power switch circuit 126 is directly coupled to the electrical conductor 132. The reset detect circuit 124 is electrically coupled to the low-speed data contacts 113 and communicatively coupled to the power switch circuit 126. The phrase "communicatively coupled" means that one component is capable of communicating information to a second component. For example, a first component communicatively coupled to a second component may send information to the second component by a wired or wireless communication medium. In the present example, the reset detect circuit 124 is capable of sending a power interrupt signal to the power switch circuit 126, as described in more detail below. The high-speed data contacts 115 are electrically coupled to the host optical transceiver module 122 for opto-electric and electro-optic conversion as described above. The power condition circuit 128 may be any circuit utilized to prepare voltage for being transmitted over the one or more electrical conductors 132, such as a voltage step-up converter, for example.

The peripheral optical engine 160A is disposed within the housing 151A of the peripheral connector 150A. The peripheral optical engine 160A of the example embodiment comprises a peripheral optical transceiver module 162 and optionally a power condition circuit 168. The power condition circuit 168 may be any circuit configured to receive voltage from the one or more electrical conductors 132 and convert it to an expected voltage at the VBUS contact on the peripheral electrical connector 152 (e.g., a voltage step-down converter). The peripheral optical transceiver module 162 is electrically coupled to the high-speed data contacts 155 for opto-electric and electro-optic conversion as described above.

In the illustrated example, the host electronic device provides power to the peripheral electronic device over the active optical cable assembly 100A.

The reset detect circuit 124 monitors the low-speed data contacts 113 for a reset detect signal according to the applicable communications standard. For the USB2 specification, the reset detect signal is a low signal on the D+ contact for 10 ms. The reset detect circuit 124 may be any circuit or integrated circuit capable of detecting the reset detect signal and providing a peripheral reset signal to the power switch circuit 126. Thus, upon detection of the reset detect signal on the one or more low-speed data contacts 113, the reset detect circuit 124 generates and provides a peripheral reset signal to the power switch circuit 126. The power switch circuit 126 is configured to receive the peripheral reset signal from the reset detect circuit 124. Upon receipt of the peripheral reset signal, the power switch circuit 126 is configured to decouple the VBUS contact from the one or more electrical conductors 132, thereby removing electrical power from the peripheral end of the active optical cable and the peripheral electronic device. The power switch circuit 126 may be any circuit or component capable of selectively coupling and decoupling the VBUS contact to and from the one or more electrical conductors 132 (or the power condition circuit 128). Power cycling of the peripheral electronic device results in restart of the USB3 state machine and successful reconnection of the peripheral electronic device to the host electronic device over the active optical cable assembly 100A. Therefore, the active optical cable assembly 100A of FIG. 3 avoids the unresponsive state (e.g., the USDPort.Disabled state) described above.

Referring now to FIG. 4, another active optical cable assembly 100B capable of resetting the USB3 state machine. The active optical cable assembly 100B of FIG. 4 is similar to that of FIG. 3 except the reset detect circuit 124 of the host optical engine 120B is communicatively coupled to the host optical transceiver module 122 and the host connector 110B does not include a power switch circuit. Additionally, the peripheral optical engine 160B of the peripheral connector 150B includes a reset generate circuit 164 that is communicatively coupled to the peripheral optical transceiver module 162 and electrically coupled to the low-speed data contacts 153. The reset detect circuit 124 may be an individual circuit separate from the host optical transceiver module 122 or integrated directly within the host optical transceiver module 122 (i.e., not a separate circuit).

As described above, the reset detect circuit 124 is configured to detect a reset signal on the host low-speed data contacts 113. When the reset signal is detected, the reset detect circuit 124 generates and provides a reset instruction signal to the host optical transceiver module 122. Upon receipt of the reset instruction signal, the host optical transceiver module 122 produces an optical reset signal on the one or more optical fibers. The host optical transceiver module 122 may also disconnect from the high-speed data contacts 115 by raising input impedance in some embodiments. This way, the host optical transceiver module 122 may ignore data on the high-speed data contacts 115. The optical reset signal is an optical handshake pulse train (i.e., a plurality of optical pulses) sent over the one or more optical fibers 134 to the peripheral end of the active optical cable assembly 100B. After the optical reset signal is sent, the host optical transceiver module 122 may reconnect to the high-speed data contacts 115 by lowering the input impedance.

The peripheral optical transceiver module 162 is configured to receive and detect the optical reset signal. Upon detection of the optical reset signal, the peripheral optical transceiver module 162 is configured to provide a received reset signal to the reset generate circuit 164. The reset generate circuit 164 is configured to produce the peripheral reset signal on one or more of the low-speed data contacts 153 of the peripheral electrical connector 152 upon receipt of the received reset signal (e.g., provide a low signal on the D+ contact for 10 ms). The reset generate circuit 164 may be a circuit that is separate from the peripheral optical transceiver module 162, or integrated directly into the peripheral optical transceiver module 162.

The peripheral reset signal on the one or more low-speed data contacts 153 causes the peripheral electronic device to exit the unresponsive state (e.g., the USDPort.Disabled state) and successful reconnection of the peripheral electronic device to the host electronic device over the active optical cable assembly 100B.

FIG. 5 illustrates another example active optical cable assembly 100C. The active optical cable assembly 100C of FIG. 5 includes the same components as the active optical cable assembly 100B of FIG. 4. However, in the host optical engine 120C of the host connector 110C, the reset detect circuit 124 is electrically coupled to the one or more electrical conductors 132 by one or more capacitors 125 rather than being electrically coupled to the host optical transceiver module 122. Additionally, in the optical engine 160C of the peripheral connector 150C, the reset generate circuit 164 is electrically coupled to the one or more electrical conductors 132 by one or more capacitors 165 rather than the peripheral optical transceiver module 162.

Upon detection of a reset detect signal on the one or more low-speed data contacts 113, the reset detect circuit 124 provides an electrical reset detect signal on the one or more electrical conductors. The electrical reset detect signal is a plurality of electrical pulses acting as a handshake signal that is imposed over the direct current voltage on the one or more electrical conductors powering the peripheral electronic device.

The reset generate circuit 164 monitors the one or more electrical conductors for the electrical reset detect signal. The reset generate circuit 164 may be any circuit capable of detecting the pulses of the electrical reset signal. Upon detection of the electrical reset detect signal, the reset generate circuit 164 produces the peripheral reset signal on the one or more low-speed data contacts 153 of the peripheral electrical connector 152. The peripheral reset signal on the one or more low-speed data contacts 153 causes the peripheral electronic device to exit the unresponsive state (e.g., the USDPort.Disabled state) and successful reconnection of the peripheral electronic device to the host electronic device over the active optical cable assembly 100B.

Referring now to FIG. 6, another example active optical cable assembly 100D is schematically illustrated. The active optical cable assembly 100D of FIG. 6 is similar to the active optical cable assembly 100C of FIG. 4 except there are no electrical conductors in the cable 130. The host connector 110D has a host optical engine 120D that includes a reset detect circuit 124 and a host optical transceiver module 122. The reset detect circuit 124 may be separate from, or included with, the host optical transceiver module 122. The peripheral connector 150D has a peripheral optical engine 160D that includes a reset generate circuit 164 and a peripheral optical transceiver module 162. The reset generate circuit 164 may be separate from, or included with, the peripheral optical transceiver module 162.

As described above, the reset detect circuit 124 is configured to detect a reset signal on the host low-speed data contacts 113. When the reset signal is detected, the reset detect circuit 124 generates and provides a reset instruction signal to the host optical transceiver module 122. Upon receipt of the reset instruction signal, the host optical transceiver module 122 produces an optical reset signal on the one or more optical fibers. The host optical transceiver module 122 may also disconnect from the high-speed data contacts 115 by raising input impedance in some embodiments. This way, the host optical transceiver module 122 may ignore data on the high-speed data contacts 115. The optical reset signal is an optical handshake pulse train (i.e., a plurality of optical pulses) sent over the one or more optical fibers 134 to the peripheral end of the active optical cable assembly 100D. After the optical reset signal is sent, the host optical transceiver module 122 may reconnect to the high-speed data contacts 115 by lowering the input impedance.

As a non-limiting example, the host electronic device may periodically send a reset signal on the low-speed data contacts 113 because it is unsure whether or not a peripheral electronic device is coupled to the peripheral electrical connector 152.

The peripheral optical transceiver module 162 is configured to receive and detect the optical reset signal. Upon detection of the optical reset signal, the peripheral optical transceiver module 162 is configured to provide a received reset signal to a reset generate circuit 164. The reset generate circuit 164 is configured to produce the peripheral reset signal on one or more of the low-speed data contacts 153 of the peripheral electrical connector 152 upon receipt of the received reset signal (e.g., provide a low signal on the D+ contact for 10 ms). The reset generate circuit 164 may be a circuit that is separate from the peripheral optical transceiver module 162, or integrated directly into the peripheral optical transceiver module 162.

The peripheral reset signal on the one or more low-speed data contacts 153 causes the peripheral electronic device to exit the unresponsive state (e.g., the USDPort.Disabled state) and successful reconnection of the peripheral electronic device to the host electronic device over the active optical cable assembly 100D.

As a non-limiting example, the reset generate circuit 164 may be configured to send a confirmation of reset signal to the peripheral optical transceiver module 162 to be sent to the host electronic device. Upon receipt of the confirmation of reset signal, the peripheral optical transceiver module 162 sends an optical confirmation of reset signal across the cable 130 over the one or more optical fibers 134. The peripheral optical transceiver module 162 may also disconnect from the high-speed data contacts 155 by raising input impedance in some embodiments. This way, the peripheral optical transceiver module 162 may ignore data on the high-speed data contacts 155.

The reset detect circuit 124 may monitor the data received by the host optical transceiver module 122, and communicate that there is a connected peripheral electronic device coupled to the active optical cable assembly 100 to the host when the optical confirmation of reset signal is detected. The host electronic device may then stop attempting to send a reset signal.

Figure 7:
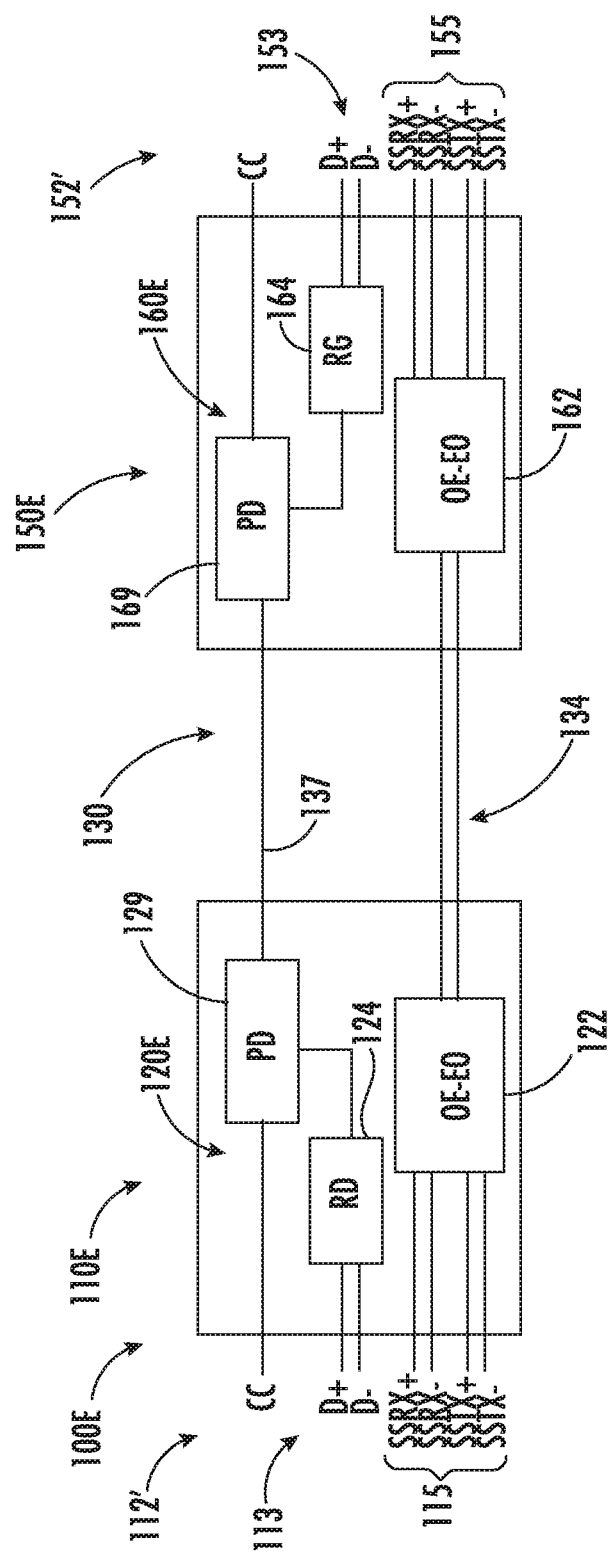
FIG. 7 schematically depicts internal components of another example active optical cable assembly having one or more electrical conductors according to one or more embodiments shown and described herein.

Referring now to FIG. 7, another example active optical cable assembly 100E is schematically illustrated. The active optical cable assembly 100E is a USB T e-C cable with Power Delivery capability. The host connector 110E includes an host optical engine 120E that comprises a host optical transceiver module 122, a reset detect circuit 124 as described above, and a host Power Delivery controller 129 as defined by the USB standard (Universal Serial Bus Power Delivery Specification Revision 3.0). The host Power Delivery controller 129 communicates the power capabilities of the host electronic device and negotiates with the peripheral Power Delivery controller 169 of the peripheral connector 150E. The reset detect circuit 124 is configured to monitor the low-speed data contacts 113 for the reset signal of the host device and is communicatively coupled to the host Power Delivery controller 129.

As shown in FIG. 7, the cable 130 includes one or more CC optical fibers 137. The peripheral optical engine 160E of the peripheral connector 150E comprises a peripheral Power Delivery controller 169 that is optically coupled to the host Power Delivery controller 129 of the host connector by the one or more CC optical fibers 137. The peripheral optical engine 160E further comprises the peripheral optical transceiver module 162 and the reset generate circuit 164. The reset generate circuit 164 is communicatively coupled to the peripheral Power Delivery controller 169 and is configured to provide the peripheral reset signal on the low-speed data contacts 153 of the peripheral electrical connector 152.

In accordance with USB Type-C, each of the host electrical connector 112' and the peripheral electrical connector 152 includes a CC contact for providing power. Upon detection of the reset signal on the one or more low-speed data contacts 113 of the host connector 110E, the reset detect circuit 124 provides a reset instruction signal to the host Power Delivery controller. Upon receipt of the reset instruction signal, the host Power Delivery controller 129 produces an optical reset signal on the one or more CC optical fibers 137.

The peripheral Power Delivery controller 169 of the peripheral connector 150E is configured to receive the optical reset signal on the one or more electrical conductors 132. Once received, the peripheral Power Delivery controller 169 provides a received reset signal to the reset generate circuit 164. As described above, upon receipt and detection of the received reset signal by the reset generate circuit 164, the reset generate circuit produces the peripheral reset signal on the one or more low-speed data contacts 153 of the peripheral connector 152'.

In another example, when a peripheral electronic device is connected to the peripheral electrical connector 152', the peripheral Power Delivery controller may detect the connection and send an optical connection signal over the one or more optical fibers 137 to the host Power Delivery controller 129. The host Power Delivery controller 129 receives the optical connection signals and sends an optical reset generate signal over the one or more optical fibers 137. The peripheral Power Delivery controller 169 receives the optical reset generate signal and sends a received reset signal to the reset generate circuit 164. Upon receipt and detection of the received reset signal by the reset generate circuit 164, the reset generate circuit 164 produces the peripheral reset signal on the one or more low-speed data contacts 153 of the peripheral connector 152'. Thus, in this example, both the host Power Delivery controller 129 and the peripheral Power Delivery controller 169 are capable of converting electrical signals into optical signals and vice-versa.

It should now be understood that embodiments described herein are directed to methods and active optical cable assemblies capable of resetting the peripheral electronic device in response to instruction from a host electronic device despite having: 1) No galvanic connection between the host connector and the peripheral connector on power and ground pins, and/or 2) no galvanic or optical connection of between data pins communicating and receiving a reset signal between the host connector and the peripheral connector. Thus, the peripheral electronic devices do not become stuck in an unresponsive state waiting for a reset signal.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

The invention claimed is:

1. An active optical cable assembly comprising:
a cable comprising a host end, a peripheral end, and one or more optical fibers between the host end and the peripheral end;
a host connector disposed at the host end of the cable and a peripheral connector disposed at the peripheral end of the cable, wherein:
each of the host connector and the peripheral connector comprises one or more low-speed data contacts, one or more high-speed data contacts, and an optical transceiver module;
the one or optical fibers are optically coupled to the optical transceiver module of the host connector and the optical transceiver module of the peripheral connector;
the optical transceiver module of each of the host connector and the peripheral connector is configured to convert electrical signals received on the respective one or more high-speed data contacts into optical signals for transmission on the one or more optical fibers, and to convert optical signals received on the one or more optical fibers into electrical signals for transmission on the respective one or more high-speed data contacts;
the one or more low-speed data contacts of the host connector are not communicatively coupled to the one or more low-speed data contacts of the peripheral connector;
the host connector further comprises a reset detect circuit that is electrically coupled to the one or more low-speed data contacts and is configured to detect a reset signal on the one or more low-speed data contacts of the host connector; and
detection of the reset signal on the one or more low-speed data contacts by the reset detect circuit causes a peripheral reset signal on the one or more low-speed data contacts of the peripheral connector.

2. The active optical cable assembly of claim 1, wherein the reset signal is a low signal for a predetermined duration of time.

3. The active optical cable assembly of claim 1, wherein:
the cable further comprises at least one electrical conductor;
each of the host connector and the peripheral connector comprises a power contact;
at least one electrical conductor electrically couples the power contact of the host connector and the peripheral connector;
the host connector further comprises a power switch circuit that is communicatively coupled to the reset detect circuit;
upon detection of the reset signal on the one or more low-speed data contacts of the host connector, the reset detect circuit of the host connector provides a power interrupt signal to the power switch circuit; and
upon receipt of the power interrupt signal, the power switch circuit electrically decouples the power contact of the host connector from the power contact of the peripheral connector, thereby removing voltage from the peripheral connector.

4. The active optical cable assembly of claim 1, wherein:
the peripheral connector comprises a reset generate circuit that is communicatively coupled to the optical transceiver module and is electrically coupled to the one or more low-speed data contacts of the peripheral connector;
the reset detect circuit is communicatively coupled to the optical transceiver module of the host connector;
upon detection of the reset signal on the one or more low-speed data contacts of the host connector, the reset detect circuit of the host connector provides a reset instruction signal to the optical transceiver module of the host connector;
upon receipt of the reset instruction signal, the optical transceiver module of the host connector produces an optical reset signal on the one or more optical fibers;
upon receipt and detection of the optical reset signal by the optical transceiver module of the peripheral connector, the optical transceiver module of the peripheral connector provides a received reset signal to the reset generate circuit; and
upon receipt and detection of the received reset signal, the reset generate circuit produces the peripheral reset signal on the one or more low-speed data contacts of the peripheral connector.

5. The active optical cable assembly of claim 4, wherein the optical reset signal comprises a plurality of optical pulses.

6. The active optical cable assembly of claim 4, wherein:
the cable further comprises at least one electrical conductor;
each of the host connector and the peripheral connector comprises a power contact; and
the at least one electrical conductor electrically couples the power contact of the host connector and the peripheral connector.

7. The active optical cable assembly of claim 1, wherein:
the cable further comprises at least one electrical conductor;
each of the host connector and the peripheral connector comprises a power contact; and
the at least one electrical conductor electrically couples the power contact of the host connector and the peripheral connector;
the reset detect circuit is electrically coupled to the at least one electrical conductor;
the peripheral connector comprises a reset generate circuit that is electrically coupled to the one or more low-speed data contacts of the peripheral connector and the at least one electrical conductor;
upon detection of the reset signal on the one or more low-speed data contacts of the host connector, the reset detect circuit of the host connector provides an electrical reset signal to the at least one electrical conductor; and
upon receipt and detection of the electrical reset signal by the reset generate circuit, the reset generate circuit produces the peripheral reset signal on the one or more low-speed data contacts of the peripheral connector.

8. The active optical cable assembly of claim 7, wherein each of the reset detect circuit and the reset generate circuit is coupled to the at least one electrical conductor by at least one capacitor.

9. The active optical cable assembly of claim 7, wherein the electrical reset signal is a plurality of electrical pulses.

10. The active optical cable assembly of claim 1, wherein the host connector and the peripheral connector are USB connectors.

11. The active optical cable assembly of claim 1, wherein the host connector and the peripheral connector are USB Type-C connectors.

12. The active optical cable assembly of claim 11, wherein:
the host connector further comprises a host CC contact and a host Power Delivery controller that is communicatively coupled to the reset detect circuit and is electrically coupled to the host CC contact;
the peripheral connector further comprises a peripheral CC contact and a peripheral Power Delivery controller that is electrically coupled to the peripheral CC contact;
the cable further comprises at least one CC optical fiber that optically couples the host Power Delivery controller to the peripheral Power Delivery controller;
the peripheral connector further comprises a reset generate circuit that is communicatively coupled to the peripheral Power Delivery controller and electrically coupled to the one or more low-speed data contacts of the peripheral connector;
upon detection of the reset signal on the one or more low-speed data contacts of the host connector, the reset detect circuit of the host connector provides a reset instruction signal to the host Power Delivery controller;
upon detection of the reset instruction signal, the host Power Delivery controller produces an optical reset signal on the at least one CC optical fiber;
upon detection of the optical reset signal by the peripheral Power Delivery controller, the peripheral Power Delivery controller provides a received reset signal to the reset generate circuit; and
upon detection of the received reset signal by the reset generate circuit, the reset generate circuit produces the peripheral reset signal on the one or more low-speed data contacts of the peripheral connector.

13. The active optical cable assembly of claim 11, wherein:
the host connector further comprises a host CC contact and a host Power Delivery controller that is communicatively coupled to the reset detect circuit and is electrically coupled to the host CC contact;
the peripheral connector further comprises a peripheral CC contact and a peripheral Power Delivery controller that is electrically coupled to the peripheral CC contact;
the cable further comprises at least one CC optical fiber that optically couples the host Power Delivery controller to the peripheral Power Delivery controller;
the peripheral connector further comprises a reset generate circuit that is communicatively coupled to the peripheral Power Delivery controller and electrically coupled to the one or more low-speed data contacts of the peripheral connector;
upon connection of a peripheral electronic device to the peripheral connector, the peripheral Power Delivery controller detects the connection and provides an optical connection signal to the host Power Delivery controller on the at least one CC optical fiber;
upon detection of the optical connection signal, the host Power Delivery controller provides an optical reset signal to the peripheral Power Delivery controller on the at least one CC optical fiber;
upon detection of the optical reset signal by the peripheral Power Delivery controller, the peripheral Power Delivery controller provides a received reset signal to the reset generate circuit; and
upon detection of the received reset signal by the reset generate circuit, the reset generate circuit produces the peripheral reset signal on the one or more low-speed data contacts of the peripheral connector.

* * * * *